United States Patent
Sakemoto et al.

(10) Patent No.: US 7,631,205 B2
(45) Date of Patent: Dec. 8, 2009

(54) INFORMATION PROCESSING APPARATUS AND CONTROL METHOD

(75) Inventors: Mikio Sakemoto, Saitama (JP); Kenichi Agata, Tokyo (JP); Yoshitaka Narukawa, Saitama (JP); Junichiro Wachi, Tokyo (JP)

(73) Assignee: Sony Corporation, Tokyo (JP)

( * ) Notice: Subject to any disclaimer, the term of this patent is extended or adjusted under 35 U.S.C. 154(b) by 554 days.

(21) Appl. No.: 11/255,871

(22) Filed: Oct. 24, 2005

(65) Prior Publication Data

US 2006/0117196 A1 Jun. 1, 2006

(30) Foreign Application Priority Data

Nov. 26, 2004 (JP) ............................ 2004-342427

(51) Int. Cl.
*G06F 1/26* (2006.01)
(52) U.S. Cl. ...................... 713/320; 713/300; 345/158; 345/173
(58) Field of Classification Search ................ 713/300, 713/320; 345/173, 158
See application file for complete search history.

(56) References Cited

U.S. PATENT DOCUMENTS

| | | | | |
|---|---|---|---|---|
| 4,680,787 | A * | 7/1987 | Marry | 455/557 |
| 6,449,724 | B1 * | 9/2002 | Sakagami | 713/300 |
| 6,819,961 | B2 * | 11/2004 | Jacobs et al. | 700/17 |
| 7,178,042 | B2 * | 2/2007 | Sakagami | 713/300 |
| 7,222,252 | B2 * | 5/2007 | Dutton et al. | 713/323 |
| 2002/0073351 | A1 * | 6/2002 | Oh | 713/500 |
| 2002/0122290 | A1 * | 9/2002 | Davis, IV | 361/683 |
| 2003/0079069 | A1 * | 4/2003 | Hung | 710/72 |
| 2004/0078606 | A1 * | 4/2004 | Chen et al. | 713/300 |
| 2006/0012577 | A1 * | 1/2006 | Kyrola | 345/173 |
| 2006/0090087 | A1 * | 4/2006 | Oh et al. | 713/300 |

FOREIGN PATENT DOCUMENTS

| | | |
|---|---|---|
| JP | 5-150871 | 6/1993 |
| JP | 11-53072 | 2/1999 |
| JP | 2000-17920 | 1/2000 |
| JP | 2001-5547 | 1/2001 |
| JP | 2001-216051 | 8/2001 |

\* cited by examiner

*Primary Examiner*—Thomas Lee
*Assistant Examiner*—Vincent T Tran
(74) *Attorney, Agent, or Firm*—Oblon, Spivak, McClelland, Maier & Neustadt, L.L.P.

(57) ABSTRACT

An information processing apparatus having a system body, a body operation unit provided on the system body, and a remote operation unit configured to perform a remote operation of the system body. The information processing apparatus performs processing according to operational information obtained by the body operation unit or the remote operation unit. The information processing apparatus includes a detecting unit to detect the operation performed by the body operation unit and the remote operation performed by the remote operation unit. Power control of each device in the system body is performed according to either a second set state in which power consumption is lower than in a first set state.

8 Claims, 8 Drawing Sheets

INFORMATION PROCESSING APPARATUS AND CONTROL METHOD

CROSS REFERENCES TO RELATED APPLICATIONS

The present invention contains subject matter related to Japanese Patent Application JP 2004-342427 filed in the Japanese Patent Office on Nov. 26, 2004, the entire contents of which being incorporated herein by reference.

BACKGROUND OF THE INVENTION

The present invention relates to an information processing apparatus configured to perform desired processing by using body operation means provided on a system body or remote operation means for remotely operating the system body, and more particularly to a technique for effecting minimum power supply in a specific use of the system by detecting the operation of the remote operation means in a battery powered condition and then automatically changing the set state of the system body to a power saving set state or to a power control mode where a power saving effect is further enhanced.

In portable computer equipment or terminal equipment as an information processing apparatus, body operation means (operation buttons or switches) provided on a system body of the system or remote operation means (remote controller) for remotely operating the system body is used to allow a desired operational input or selection by the user. In such a configuration, the operation or control condition of each device in the system body can be changed by a predetermined operation by the user, so as to obtain a sufficient power saving effect in the battery powered condition. For example, it is known that the power consumption of each device is controlled stepwise according to the number of operations by the user (e.g., see Japanese Patent Laid-open No. 2004-246600).

It is known that a dedicated button or switch to be explicitly operated by the user is provided as to setting or changing of a power saving function. Further, it is known that a key (soft key) or the like on a display screen is operated by the user with a pointing device or a touch panel, for example, thereby validating a power saving set state.

As another configuration, it is known that such a function of power saving setting or changing is assigned to any existing operation button to thereby eliminate the need for any dedicated button. For example, in the case that an operational error prevention switch is so provided as to serve also as a switch for changing the set state to a power saving set state, a plurality of functions can be collectively assigned to one switch, thereby contributing to a reduction in number of switches.

In many types of power saving mechanisms for an information processing apparatus, information stored in volatile storing means (memory) is maintained by any method and the supply of power to all the other devices is cut off to provide a standby state, thereby suppressing the power consumption.

SUMMARY OF THE INVENTION

In the above system in related art, however, the power saving function is exhibited when the user operates a specific key to which a function of power saving setting or changing is assigned or the user changes the set state through a predetermined operational procedure. Accordingly, the user is required to operate as bearing the current set state in mind.

For example, in the case of operating the system body by using the remote operation means, the use of the system is frequently limited and it is therefore desired to effect power saving of the system body. Accordingly, the user is required to perform an operation for changing a power saving set state. In the standby state where each device in the system body is powered off, a function intended by the user cannot be used. Therefore, minimum power control for realization of this function is required. However, if a setting operation for such power control is manually performed, the convenience of the user is damaged.

Therefore, it is desirable to exhibit a power saving effect by implementing intended function without user's particular consciousness for power saving. In an embodiment of the present invention, the information processing apparatus including the body operation means provided on the system body or the remote operation means, the operation of the system body and the operation of the remote operation means are distinguished to automatically change the set stage of the system body to the power saving mode when the remote operation is performed in a battery powered condition.

Therefore, it is desirable to provide an information processing apparatus having body operation means provided on a system body and remote operation means for remotely operating the system body. The operation of the body operation means and the operation of the remote operation means are distinguished, and the set state of the system body is automatically changed to a power saving set state when the remote operation means is operated in a battery powered condition, thereby exhibiting a power saving effect without the need for user's intention to power saving in realizing a desired function.

An information processing apparatus of an embodiment of the present invention includes a system body, body operation means provided on said system body, and remote operation means for use in performing a remote operation of said system body. The information processing apparatus includes means for distinguishing between the operation by the body operation means and the operation by the remote operation means. Power control of each device in the system body is performed according to a first set state during the operation of the body operation means. When the operation of the remote operation means is performed in a battery powered condition, power control of each device in the system body is performed according to a second set state where power consumption is lower than that in the first set state.

A control method for an information processing apparatus of an embodiment of the present invention includes the steps of distinguishing between the operation by the body operation means and the operation by the remote operation means, performing power control of each device in the system body according to a first set state during the operation of the body operation means, and performing power control of each device in the system body according to a second set state where power consumption is lower than that in the first set state when the operation of the remote operation means is performed in a battery powered condition.

With this configuration, the set state of the system body can be automatically changed to a power saving set state when the remote operation is performed in the battery powered condition. Accordingly, unlike the related art, the user need not intentionally perform a predetermined operation with power saving in mind. Further, in the case of specifying the use of the system in the remote operation, the power saving set state is adopted to thereby minimize the power consumption.

In an information processing apparatus having remote operation means, the present invention is effective in improving the operability and convenience, and any learning of the operation for power saving setting is not required. Further, it is possible to exhibit a power saving effect in realizing a specific function in the remote operation in the battery powered condition.

Preferably, when the operation of the body operation means is performed during the power control of each device in the system body according to the second set state, the second set state is changed to the first set state. Accordingly, the power saving set state is automatically canceled by the operation of the body operation means, thereby improving the convenience.

Preferably, the whole or part of the operation of the body operation means is invalidated in the second set state. Accordingly, an operational error or the like can be prevented, and the user need not operate any operational error prevention switch or the like.

BRIEF DESCRIPTION OF THE DRAWINGS

These and other objects of the present invention will be seen by reference to the description, taken in connection with the accompanying drawings, in which.

DETAILED DESCRIPTION OF THE PREFERRED EMBODIMENTS

The present invention provides a mechanism for distinguishing between the operation of an operational portion including operation buttons and switches provided on a system body and the operation of an operational portion using remote operation section to obtain a necessary and sufficient power saving effect in performing the remote operation and to realize power saving in a specific use of an information processing apparatus. The present invention is widely applicable to various systems such as computer equipment, personal digital assistant (PDA), mobile communication terminal, video equipment, and audio equipment.

Figure 1:
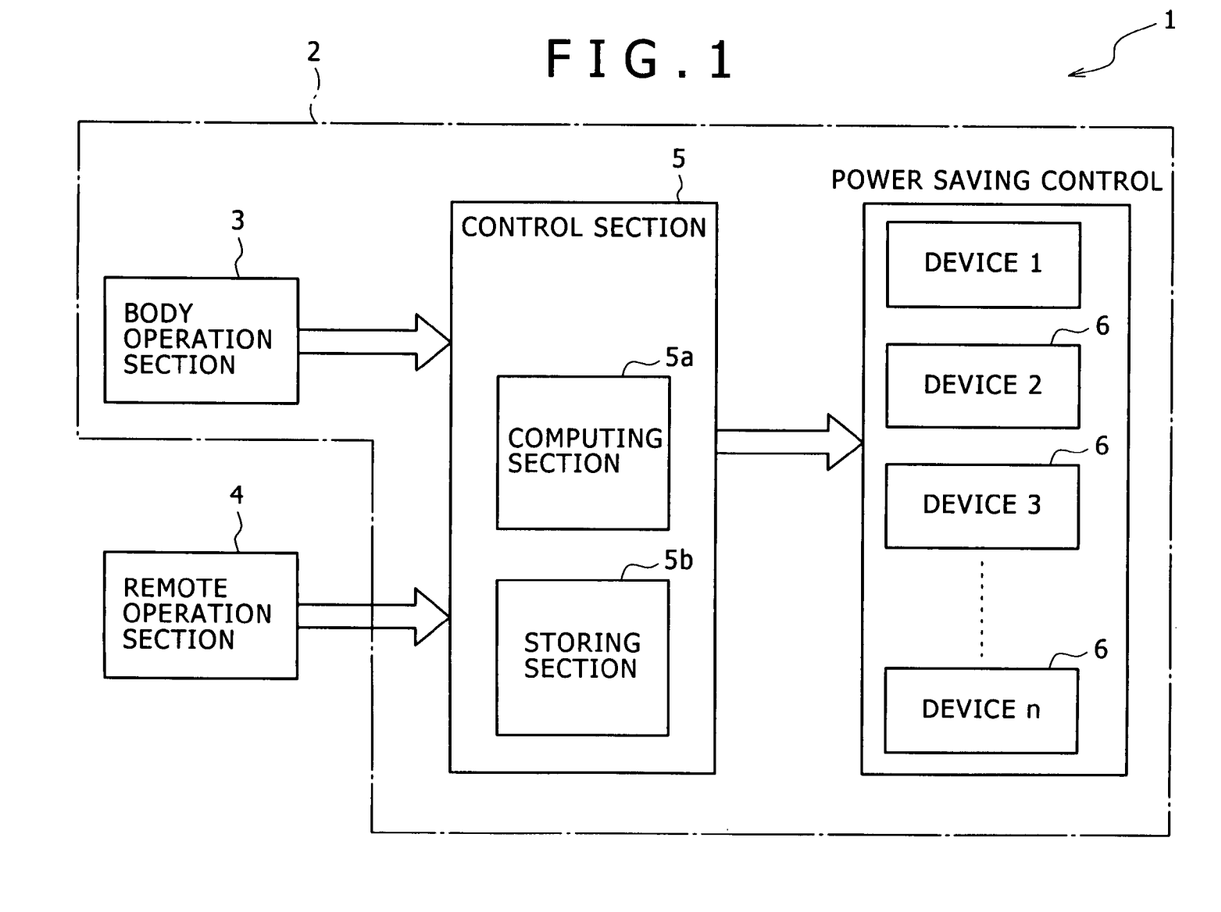
FIG. 1 is a block diagram showing a basic configuration according to an embodiment of the present invention.

FIG. 1 is a block diagram showing a basic configuration according to the present invention.

Reference numeral 1 generally denotes an information processing apparatus according to the present invention. The information processing apparatus 1 includes a system body 2, body operation section 3 provided on the system body 2, and remote operation section 4 for use in performing the remote operation of the system body 2.

For example, the body operation section 3 includes hardware keys such as operation buttons and switches and on-screen keys (soft keys or virtual keys) adapted to be selected or instructed by using a pointing device, touch panel, etc. Operational information by the body operation section 3 is sent to control section 5.

For example, the remote operation section 4 includes a wired remote controller adapted to be connected through a connection cord or the like to the system body 2 or a wireless remote controller using infrared communication or the like. Operational information by the remote operation section 4 is sent to the control section 5.

The control section 5 performs processing or control according to the operational information by the body operation section 3 or the remote operation section 4. For example, the control section 5 includes computing section 5a such as a CPU (Central Processing Unit) and storing section 5b for storing various controllers, control programs, etc.

For example, in the case of using a control device configured to allow the user to perform desired processing with the use of an application operating on an OS (Operating System) and to integrally manage many pieces of operational information by operation buttons, keys, etc., the operational information is sent from the control device to a host device driver, and is further sent through an OS layer to an application layer, thereby executing application processing according to key operations.

The control section 5 distinguishes between the operation using the body operation section 3 and the operation using the remote operation section 4 to perform power saving control for various devices 6 according to different set states (S1) and (S2) shown below. In FIG. 1, "DEVICE i" (i=1, 2, 3, ..., n) represents the various devices 6 (e.g., display device, auxiliary storage device, and communication connection device) provided in the system body 2.

(S1): first set state (in the case of operating the body operation section 3)

(S2): second set state (in the case of operating the remote operation section 4)

In the case of operating the body operation section 3, power control for each device 6 in the system body 2 is performed according to the first set state (S1). This set state (S1) includes a state where the power saving control is not performed at all or a state where necessary power saving control is performed according to operational conditions, functions to be realized, or set information by the user, for example.

In the case of operating the remote operation section 4 in the condition where the system body 2 is powered through a battery, the set state (S1) is changed to the set state (S2). The set state (S2) is a state where power consumption is lower than that in the set state (S1). For example, in the set state (S2), minimum power control required for realization of a use-specific function is performed.

When the body operation section 3 is operated or it is detected that the wired remote operation section 4 has been disconnected from the system body 2 in the case that the power control of each device 6 in the system body 2 is being performed in the set state (S2), the set state (S2) is canceled to restore the set state (S).

Thus, the set state (S1) is changed to the set state (S2) when the remote operation section 4 is operated in the battery powered condition, whereas the set state (S2) is changed to the set state (S) when the body operation section 3 is operated. However, if the change between the set states (S1) and (S2) is made in response to one operation, there is a problem on an operational error or the like. To solve this problem, the change between the set states (S1) and (S2) may be made when at least a predetermined number of operations is performed or a continuous operation of each sections 3 or 4 is expected or estimated.

As a modification, a third set state (intermediate state) (S3) may be interposed between the first set state (S1) and the second set state (S2). The first set state (S1) is changed through the third set state (S3) to the second set state (S2), or the second set state (S2) is changed through the third set state (S3) to the first set state (S1). In other words, in the case that whether the change to the set state (S1) or (S2) is to be made is determined with probability in the set state (S3), the control of changing to the set state (S1) or (S2) is allowed.

Thus, according to the present invention, the user need not explicitly perform any power saving intended operation (e.g., operation of a hold switch or the like for prevention of an operational error), that is, any operation with power saving in mind is not required, thereby contributing to an improvement in operability.

Figure 2A:
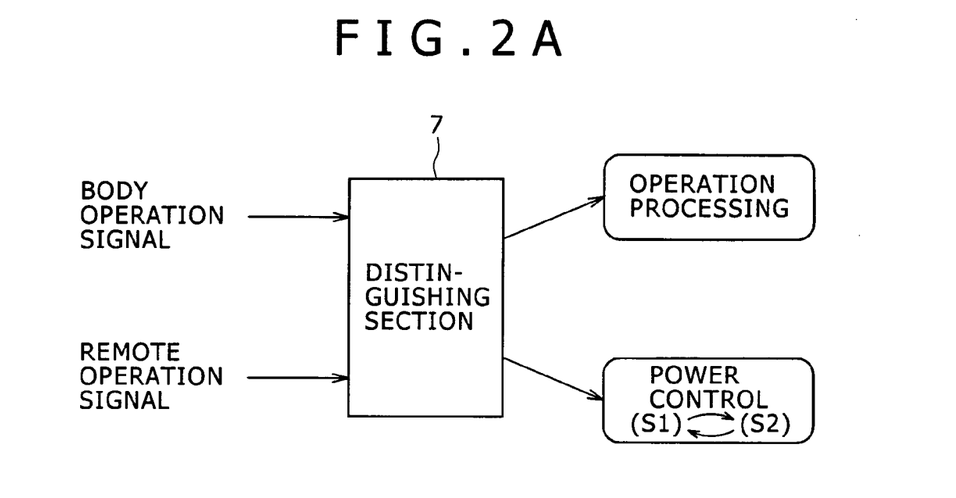
FIGS. 2A and 2B are schematic diagrams for illustrating power saving control according to an embodiment of the present invention.
Figure 2B:
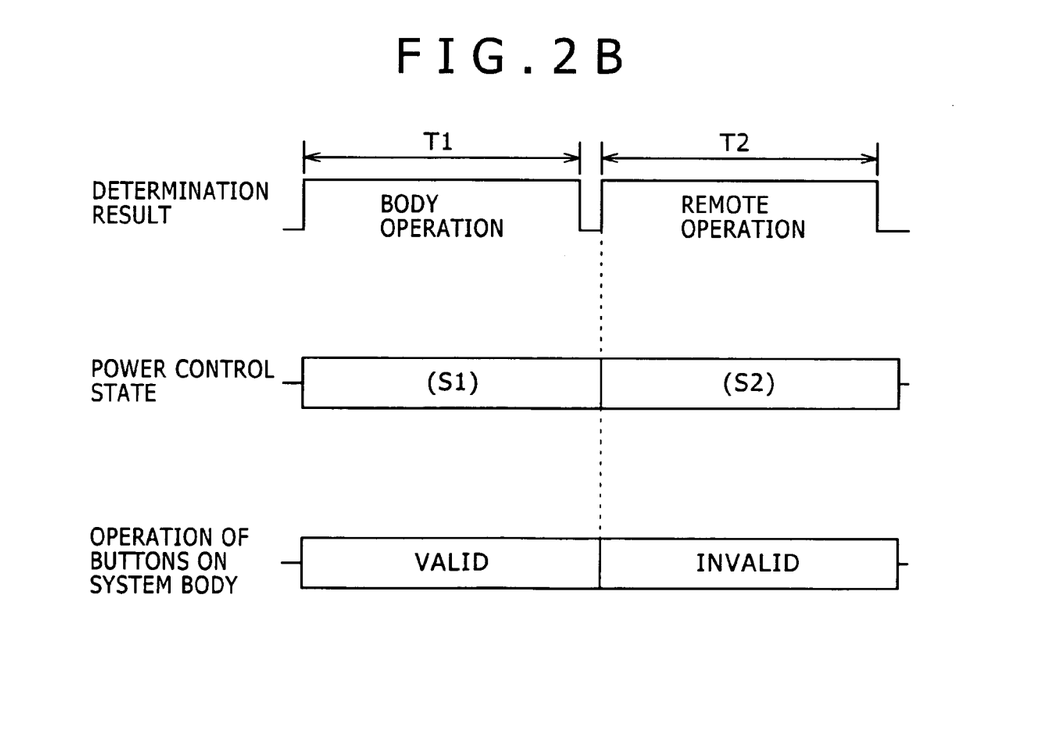

FIGS. 2A and 2B are schematic diagrams for illustrating the above control.

As shown in FIG. 2A, the operation by the body operation section 3 and the operation by the remote operation section 4 are distinguished by distinguishing section 7, and the determination result output from the distinguishing section 7 is reflected on operation processing (including validation or invalidation setting processing) and power control (including the control in the set states (S1) and (S2)).

FIG. 2B shows the determination result at the upper position, the set state relating to the power control at the middle position, and the valid or invalid state relating to the operation by the body operation section 3 at the lower position.

As to the determination result, the operation by using the body operation section 3 is performed during a time period "T1", and the operation by using the remote operation section 4 is performed during a time period "T2".

As to the set state relating to the power control, the set state (S1) is adopted during the above time period "T1", and the set state (S2) is adopted during the above time period "T2". In a power control section, each device 6 and a power supply in the system body 2 are integrally controlled to change a power consuming condition (specific power saving control in each set state will be hereinafter described in detail).

As to the operation of the buttons etc. provided on the system body 2, it is set to a valid state during the time period "T1", whereas it is set to an invalid state during the time period "T2" (i.e., only the remote operation is made valid). The reason for such invalidation is to prevent an inadvertent change from the set state (S2) to the set state (S1) due to the operation of the body operation section 3 by an operational error, contact, etc. in the set state (S2). While it is known that operation section for prevention of an operational error, such as a hold switch, is used to invalidate the operation of the system body, any specific button or the like is not required in the case that the whole or part of the operation by the body operation section 3 is invalidated in the set state (S2), so that it is effective in applying the present invention to compact equipment in which the footprint of operation buttons is limited. In the case that the whole of the operation of the system body is invalidated in the set state (S2), it is necessary to perform an operation for validation by operating the remote operation section 4. Further, in the case that a part of the operation of the system body is invalidated, it is necessary to perform the operation of validation by operating specific operation section of the system body 2 or by operating the remote operation section 4. In this case, only a predetermined operation may be invalidated or only an operation specified by the user may be invalidated.

As mentioned above, the operation by using the body operation section 3 and the operation by using the remote operation section 4 are distinguished from each other, and in the case that the operation by the remote operation section 4 is performed in the battery powered condition, the set state of the system body is automatically changed to the power saving set state. Accordingly, an improvement in operability and a reduction in footprint can be attained.

Further, the set state of the system body is automatically changed to a specific power saving set state when the operation by only the remote operation section 4 is performed. Accordingly, the user need not especially bear power saving in mind, but a power saving effect can be easily obtained (e.g., it is possible to obtain a power saving state where power consumption is minimized).

Similarly, when the body operation section 3 is operated in the set state (S2), the set state (S2) is automatically changed to the original power controlled state. At this time, the user need not especially bear this change in mind.

Since any specific switch for changing the set state to the power saving set state or any operational error prevention switch (dual-purpose switch) is not required, the footprint of such a switch can be reduced (if such a specific switch or an operational error prevention switch is provided, the footprint of such a switch is increased).

Further, in the case of assuming the limitation of uses in operating the system body by using only the remote operation section 4, the battery operation time in such a particular use can be extended by setting a power saving state where only a minimum device required for realization of an intended function is powered. For example, the operation of the system body may be invalidated in the power saving set state to thereby extend the battery operation time in operating the system body by using the remote operation section 4 and also to suppress undue heat generation or the like, thereby improving the safety.

There will now be described a specific preferred embodiment of the present invention applied to portable computer equipment with reference to FIGS. 3 to 8. In this preferred embodiment, the portable computer equipment includes wired remote operation section 4 adapted to be connected to a system body.

Figure 3:
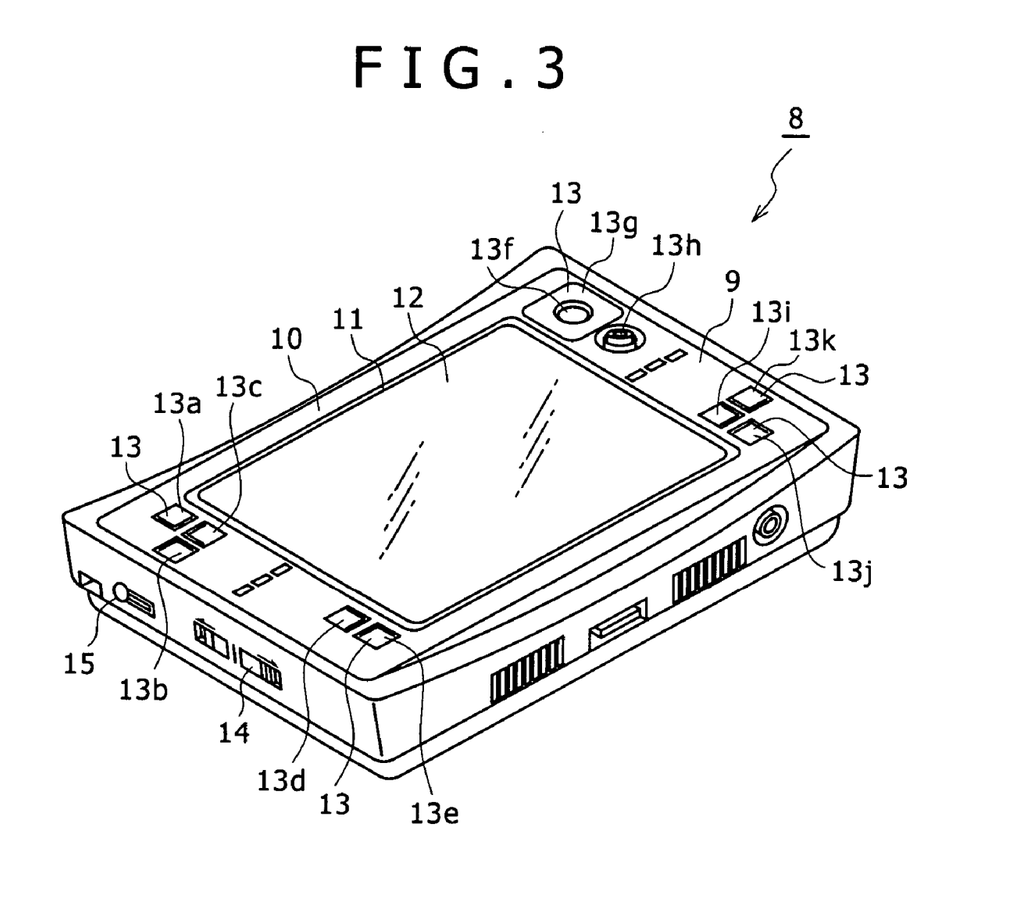
FIG. 3 is a perspective view of a system body of an information processing apparatus according to an embodiment of the present invention.

FIG. 3 shows the system body of an information processing apparatus 8 as the portable computer equipment. As shown in FIG. 3, the system body has a flat rectangular housing 9 horizontally oriented. The housing 9 has a front face 10 provided with a display device (e.g., liquid crystal display) 11 for displaying an image.

The display device 11 has a display screen 12 provided with a touch panel such that a desired position on the display screen 12 is pointed (tapped) by a user's finger or a dedicated input pen (e.g., stylus) not shown to thereby perform a select operation or input operation, for example.

A plurality of operation buttons 13 are provided at given positions on the housing 9. These operation buttons 13 are classified as follows:

(a) Center button 13a, left button 13b, and right button 13c (at an upper position on the left side of the display screen 12)

(b) Zoom button 13d and rotation button 13e (at a lower position on the left side of the display screen 12)

(c) Enter button 13f, cursor key 13g, and operating portion 13h of a pointing device (operating stick) (at an upper position on the right side of the display screen 12)

(d) Function select button 13i, start button 13j, and brightness change button 13k (at a lower position on the right side of the display screen 12)

The center button 13a, the left button 13b, and the right button 13c are buttons corresponding to mouse buttons. The zoom button 13d is a button for scaling an image displayed on the screen 12. The rotation button 13e is a button for 90° rotating an image displayed on the screen 12.

The enter button 13f is a button corresponding to the Return key (Enter key) on a keyboard. The cursor key 13g is used in the case of moving a cursor in vertical and horizontal directions on the screen 12. The operating portion 13h of the pointing device is used in the case of moving a pointer on the screen 12. The function select button 13i is a button for making a change in sound level or switching an output to an external display, for example. The start button 13j is a button for starting a specific application. The brightness change button 13k is a button for changing the brightness on the display device 11.

A power switch 14 for use in turning the power on or off is provided on the left side surface of the housing 9.

These operation buttons 13 and the switch 14 constitute the body operation section 3. The assignment of the functions of these operation buttons 13 and the switch 14 may be freely changed as a modification.

A connector 15 is also provided on the left side surface of the housing 9 at a position somewhat spaced from the power switch 14, and a remote controller to be hereinafter described is adapted to be connected to the connector 15.

Figure 4:
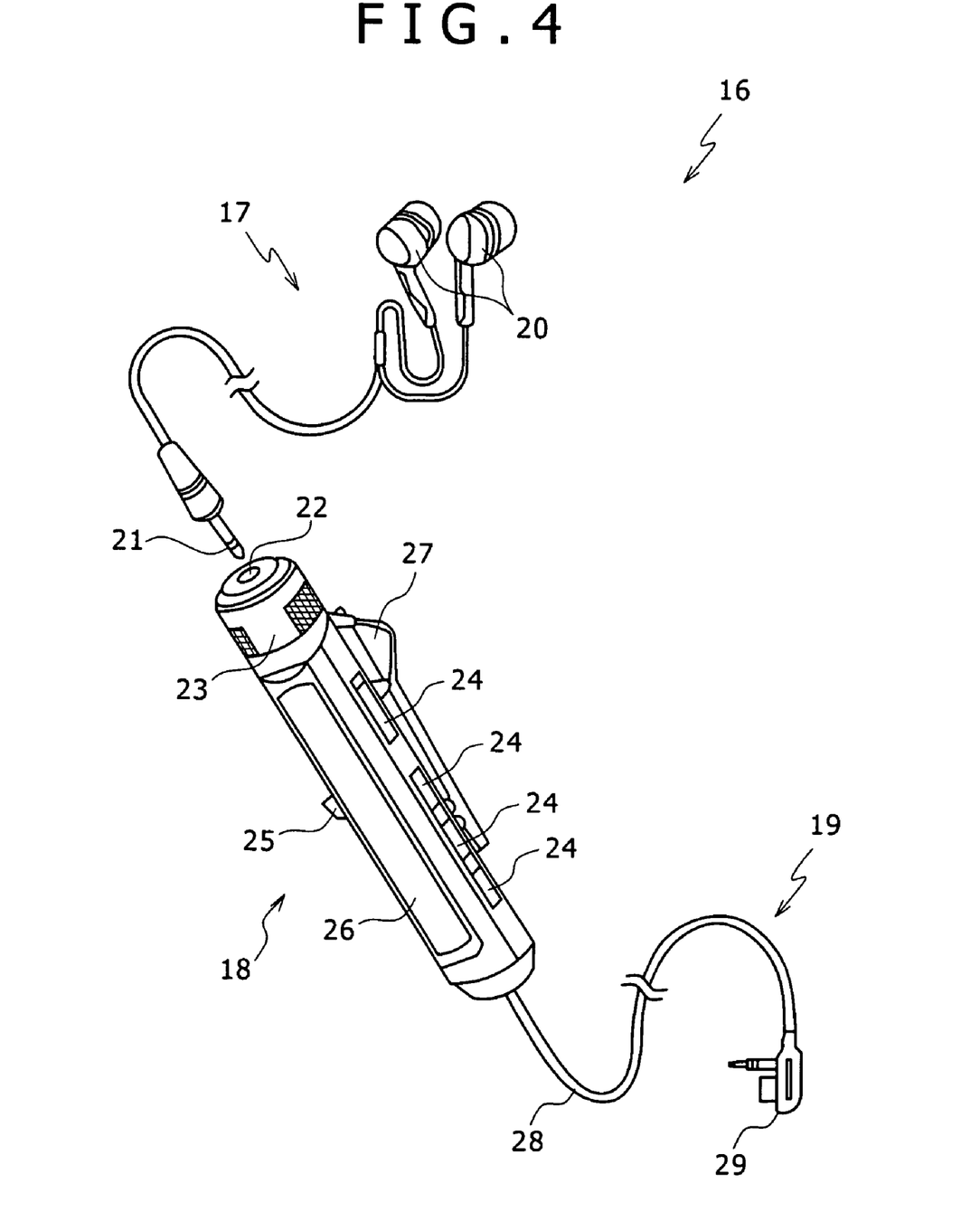
FIG. 4 is a perspective view of a remote controller as an example of the remote operation means adapted to the system body shown in FIG. 3.

FIG. 4 shows a remote controller (which will be hereinafter abbreviated as "RC") 16 corresponding to the remote operation section 4.

The RC 16 is composed of a sound output portion 17, an operating portion 18, and a connecting portion 19 adapted to be connected to the system body.

The sound output portion 17 includes a headphone 20, which is connected to a stereo miniplug 21. The stereo miniplug 21 is adapted to be connected to a jack 22 of the operating portion 18.

The operating portion 18 is provided with various operation elements. For example, such operation elements include an operation switch 23 for controlling a sound level, a plurality of operation buttons 24 necessary for sound reproduction, mode selection, etc., and an operation lever 25. Further, the operating portion 18 incorporates displaying section (e.g., liquid crystal display) for providing information to the user, and this displaying section has a display window 26. Further, a clip 27 for holding the operating portion 18 at a desired place is provided.

The connecting portion 19 is composed of a connection cord 28 connected to a circuit provided in the operating portion 18 and a connector 29 provided at the tip of the connection cord 28. The connector 29 is adapted to be connected to the connector 15 of the system body.

Figure 5:
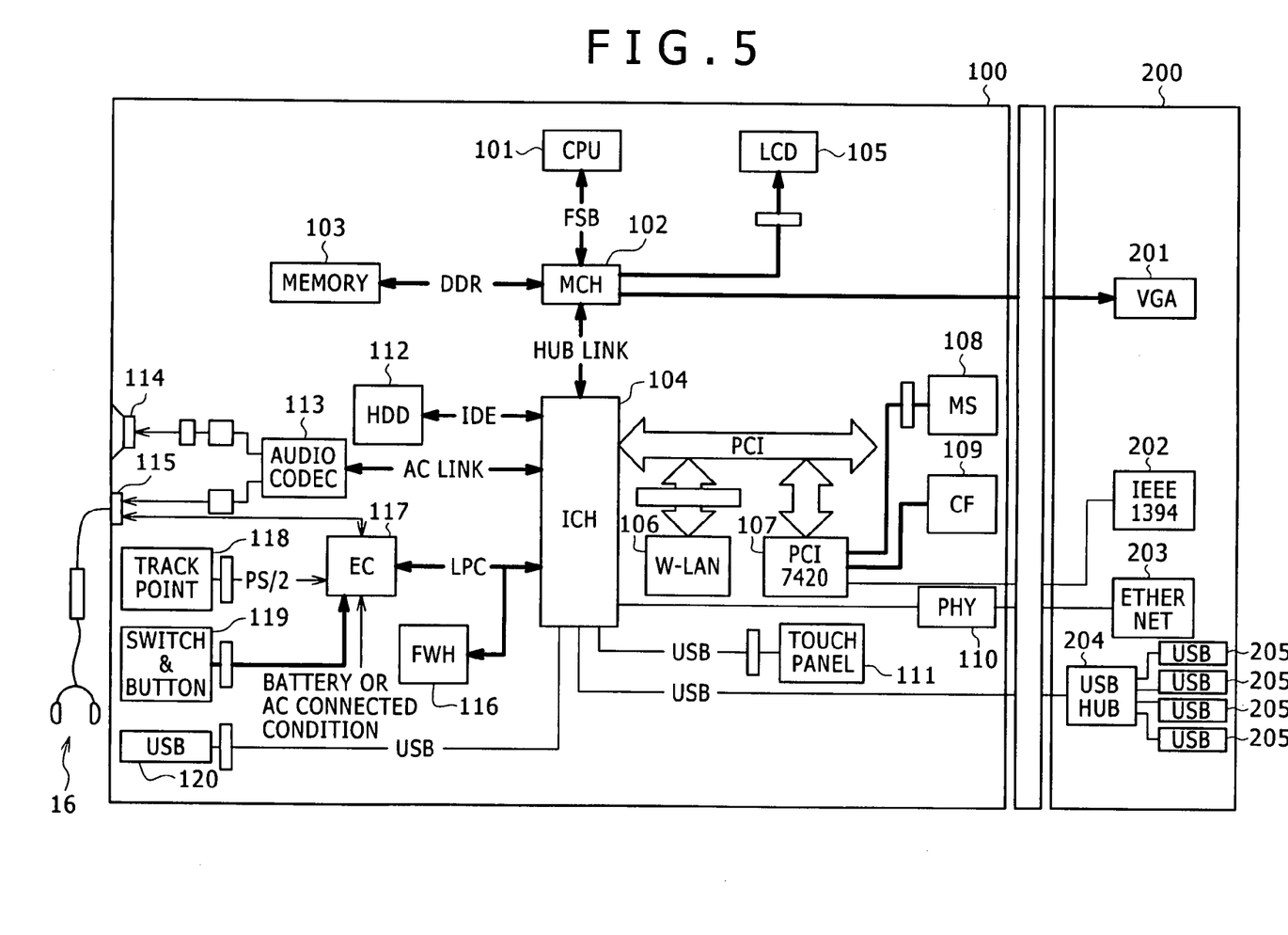
FIG. 5 is a block diagram showing a hardware configuration of the information processing apparatus.

FIG. 5 shows a hardware configuration of the information processing apparatus 8. Reference numeral 100 denotes the system body of the information processing apparatus 8. The system body 100 is adapted to be connected through a connecting unit (port replicator) 200 to external equipment.

The configuration of the system body 100 will now be described.

A CPU 101 as a control center is connected through a bus (FSB: Front Side Bus) to a control device 102. The control device 102 is provided to control a main memory 103 and to perform control on a graphic function. The control device 102 serves mainly to process a large amount of data at a high speed. In AT compatible machines, the control device 102 is called a "North Bridge". The main memory 103, a graphic display device 105 such as a liquid crystal display, and a control apparatus 104 are connected to the control device 102.

The control apparatus 104 is provided to mainly control various control devices for user interface or the like and to perform bus link for the devices. In AT compatible machines, the control apparatus 104 is called a "South Bridge". In the case of a "PCI to ISA bridge", the control apparatus 104 serves as a bridge between a bus (PCI: Peripheral Component Interconnect bus) and a low-speed bus (ISA: Industry Standard Architecture bus), and has functions as an ISA controller, IDE (Integrated Drive Electronics) controller, etc.

Connected to the PCI bus are a wireless LAN (W-LAN) as a wireless communication device 106 and a device 107 for making the connection and control of an external memory and external equipment. The external memory includes a semiconductor memory apparatus adapted to be removably mounted to the system body 100, such as a stick-shaped memory medium and a card-shaped memory medium (e.g., CF card). Connected to the device 107 are a control device 108 for reading/writing data from/to the stick-shaped memory medium and a control device 109 for reading/writing data from/to the card-shaped memory medium. Further, the device 107 has a function as a connection interface to the external equipment (e.g., "IEEE 1394" defining hardware specifications for addition of a serial device to a computer.

Further connected to the control apparatus 104 are a connection device 110 for a LAN (Local Area Network) such as Ethernet (registered trademark) and an input device 111 using a touch panel through a USB (Universal Serial Bus) port.

An auxiliary storage device 112 such as a disk drive using a magnetic disk or an optical disk is connected to the control apparatus 104 (specifically, to an IDE controller in the control apparatus 104). In this preferred embodiment, a hard disk drive using a hard disk as a large-capacity storage medium is used as the auxiliary storage device 112.

An audio signal processing portion (Audio Codec) 113 is also connected to the control apparatus 104. The audio signal processing portion 113 functions to send a digital-analog converted audio signal to a speaker 114 and through a connecting portion 115 (inclusive of the connector 15) to the headphone 20 of the RC 16, thereby outputting a sound. In the case of using a microphone, the audio signal processing portion 113 performs a process of digitizing sound input data, for example. The sound signal output processing mentioned above can be performed independently of video signal processing in relation to image display. Therefore, for example, in the condition where the supply of power to the graphic display device 105 is cut off, the user can perform an operation such as music reproduction by using the operation buttons 24 of the RC 16.

A storage apparatus 116 preliminarily stores a control program for operating the computer, for example, and it is connected through an LPC (Low Pin Count: serial bus) to the control devices 104 and 117.

The control apparatus 117 is a versatile apparatus for performing the control of various signals. For example, an "EC" (Embedded Controller) is used as the control apparatus 117, which controller has a function as a keyboard controller and performs the power control of the system, the control on added functions of the system, etc. (In portable equipment or the like, a microcomputer is mounted in the control apparatus 117). By changing the control program stored in the storage apparatus 116, a control method for the computer can be changed.

An operating device 118 constituting a stick type pointing device (e.g., track point) is connected to a port (e.g., PS/2 (Personal System/2) port) of the control apparatus 117. Further, a signal from an operating portion 119 including the switches and the operation buttons provided on the system body 100 is sent to the control apparatus 117.

An operational signal from the RC 16 is sent through the connecting portion 115 to the control apparatus 117, and is then processed in the control apparatus 117.

A connecting portion 120 such as a USB connector is provided to directly connect external equipment to the system body 100. The connecting portion 120 is connected to the control apparatus 104.

Commercial power from an AC adapter or DC power from a battery pack using a secondary battery or a fuel cell, for example, is supplied to a power supply portion (not shown). For example, the EC 117 detects a connected or mounted condition of the AC adapter or the battery pack, and holds various kinds of management information including a remaining battery level.

The configuration of the connecting apparatus 200 will now be described.

The system body 100 is adapted to be connected through connecting section such as a connector to the connecting apparatus 200, thereby allowing signal transmission to external equipment (not shown).

A connector portion 201 for connecting an external display apparatus through a VGA (Video Graphics Array) connector or the like is adapted to be connected to the control device 102 in the system body 100, thereby outputting a video signal or the like to the external display apparatus.

A connector portion 202 for connecting external equipment or the like conforming to "IEEE 1394" standard is adapted to be connected to the device 107 in the system body 100, and a connector portion 203 for connecting an Ethernet cable or the like is adapted to be connected to the device 110 in the system body 100. A line concentration device 204 such as a USB hub is adapted to be connected to the control apparatus 104 in the system body 100. In this preferred embodiment, four USB connectors 205 are provided in the connecting apparatus 200 and they are connected to the USB hub 204.

Figure 6:
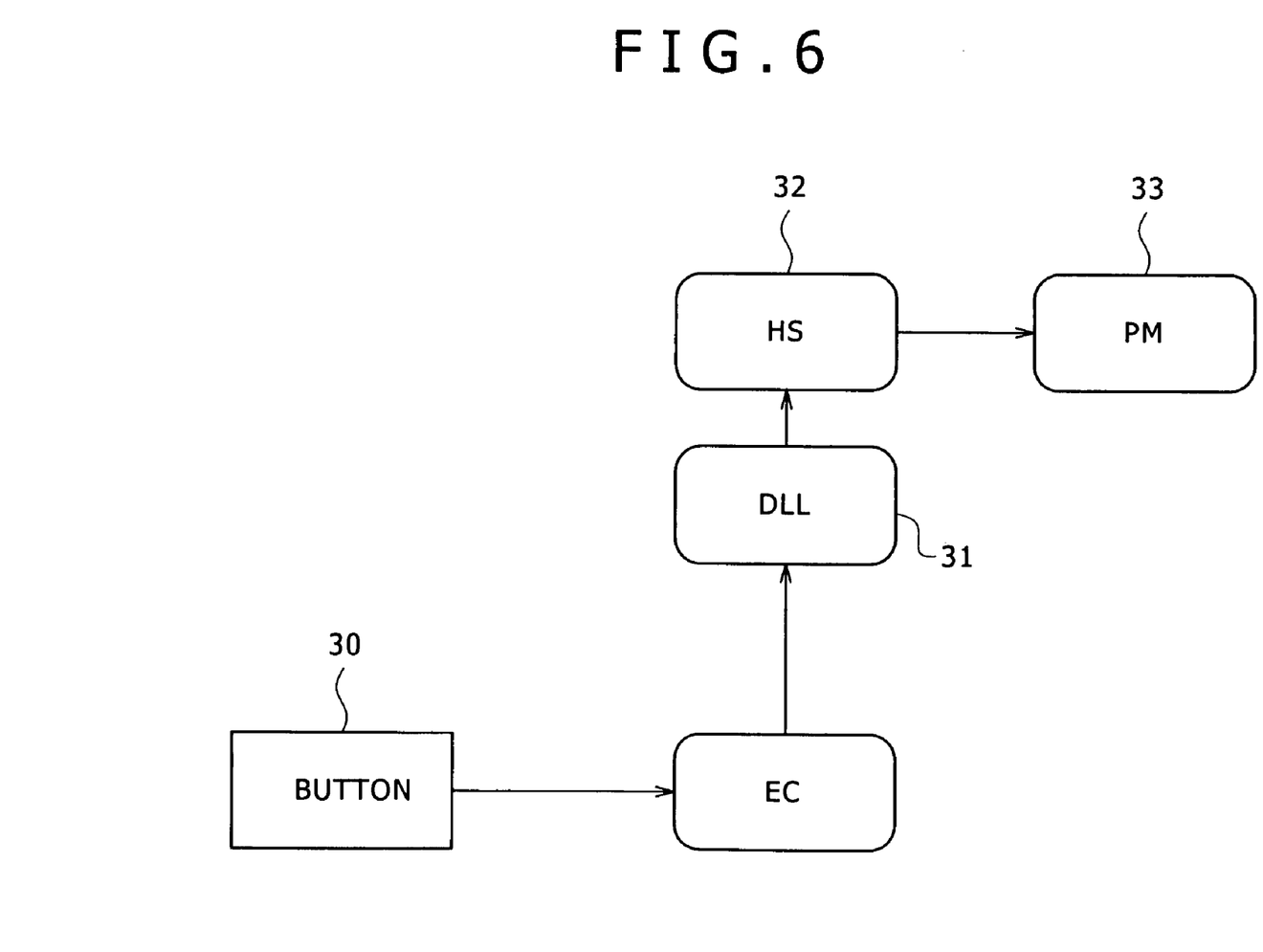
FIG. 6 is a schematic diagram showing an essential part of a layered structure in the hardware configuration and the software configuration.

FIG. 6 is a schematic block diagram for illustrating change or switch control of the power saving set state in relation to the operation using the operation buttons or the like of the system body 100 or the operation using the RC 16. More specifically, FIG. 6 shows an essential part of a layered structure in the hardware configuration and the software configuration in this preferred embodiment.

An operation element 30 representing the various operation buttons, switches, etc. mentioned above and an EC (including a programmable I/O controller) are positioned in a hardware layer as a lowermost layer.

A dynamic link library (DLL) 31 is positioned in a software layer higher than the hardware layer. Further, a first program (HS) 32 and a second program (PM) 33 are positioned in an application layer higher than the software layer. The program 32 is a utility for operation processing for a hot key or the like, and the program 33 is a utility for power management.

Operational information by the operation buttons or the like of the system body 100 or operational information by the RC 16 is detected by the EC. In other words, the EC constitutes the distinguishing section 7 to distinguish between the operation by the operation buttons or the like of the system body 100 and the operation by the operation buttons or the like of the RC 16. Then, information including operational status and key operational information is sent from the EC to the dynamic link library 31, and further sent from the dynamic link library 31 to the program 32. Further, state change information on power control is sent from the program 32 to the program 33. The program 33 changes the controlled states and power feed states of the various devices in the system body to thereby reduce the power consumption of the system body, thus exhibiting a power saving effect.

The power control by the program 33 is such that set information in the remote operation and set information in the operation of the system body are prepared in advance and that when the RC 16 is operated in the battery powered condition, the set state is changed to a power saving set state, whereas when any operation button or the like of the system body is operated, the power saving set state is canceled to restore the original set state.

Figure 7:
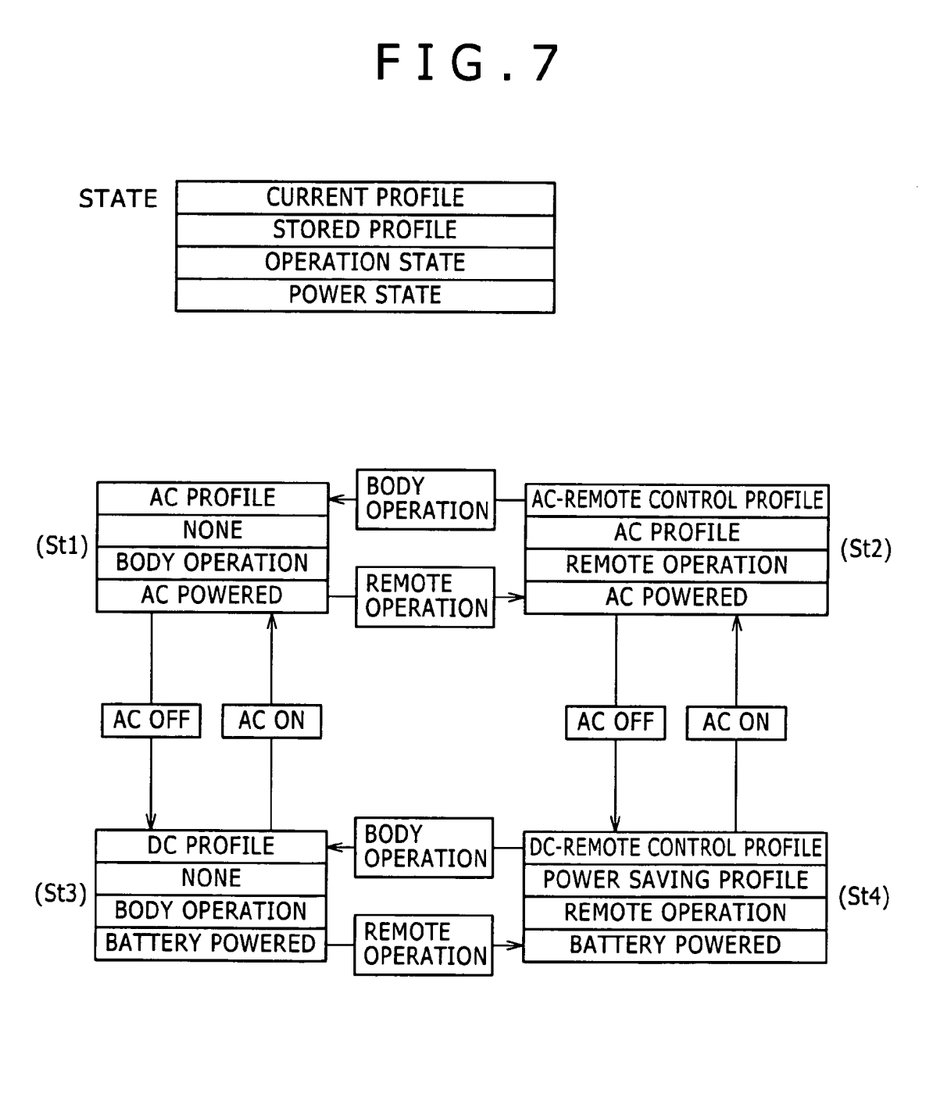
FIG. 7 is a schematic diagram showing state transition among four states in relation to a power management state.

FIG. 7 illustrates state transition among four states (St1) to (St4) shown below in relation to a power management state. In this example, the power control state is determined according to switching of profiles including various kinds of set information. In FIG. 7, the four rows in a rectangular frame showing each of the states (St1) to (St4) represent a current profile, a stored profile, an operation state (body operation or remote operation) of the system body, and a power state (AC powered or battery powered) from the upper to lower row.

The state (St1) is an "AC profile", which uses power from the AC adapter (AC powered). In this state, no profile is stored, and the operation by the operating portion 119 of the system body 100 is performed.

The state (St2) is an "AC-remote control profile", which uses power from the AC adapter (AC powered). In this state, the "AC profile" is stored, and the remote operation of the system body 100 is performed.

The state (St3) is a "DC profile", which is a battery powered state. In this state, no profile is stored, and the operation by the operating portion 119 of the system body 100 is performed.

The state (St4) is a "DC-remote control profile", which is a battery powered state. This profile is a profile capable of obtaining a maximum power saving effect. In this state, a "power saving profile" is stored, and the remote operation of the system body 100 is performed.

In each of the states (St1) and (St2), commercial power from the AC adapter is used to operate the system. In each of the states (St3) and (St4), DC power from the battery is used to operate the system.

The transition among the states (St1) to (St4) is effected as shown by the arrows in FIG. 7, and the related operation and cause (or trigger) of operation are as follows:

Difference in cause of operation (see "Body Operation" and "Remote Operation" in FIG. 7)

Connection and disconnection of the AC adapter (see "AC on" and "AC off" in FIG. 7

In the AC powered state, the transition from the state (St1) to the state (St2) is effected by the operation of the RC 16, whereas the transition from the state (St2) to the state (St1) is effected by the operation of the operation buttons 13 of the system body.

In the battery powered state, the transition from the state (St3) to the state (St4) is effected by the operation of the RC 16. In other words, a maximum power saving effect is obtained by this transition. Accordingly, the battery operation time can be extended in a specific function of the system body 100 by the remote operation (e.g., a function of reproducing music to allow the user to listen to the music with the headphone). Further, the transition from the state (St4) to the state (St3) is effected by the operation of the operation buttons 13 of the system body.

As to the state transition according to the connection and disconnection of the AC adapter, the "AC off" shown in FIG. 7 indicates that the AC adapter is disconnected from the system body, and the "AC on" shown in FIG. 7 indicates that the AC adapter is connected to the system body. In other words, the transition from the state (St1) to the state (St3) is effected by the disconnection of the AC adapter, whereas the transition from the state (St3) to the state (St1) is effected by the connection of the AC adapter. Further, the transition from the state (St2) to the state (St4) is effected by the disconnection of the AC adapter, whereas the transition from the state (St4) to the state (St2) is effected by the connection of the AC adapter.

Each device in the system body is controlled by the processing according to set values in relation to each profile mentioned above. Further, to obtain a power saving effect, the throughput of any device is changed, the use of any device is stopped, or the supply of power to any device is stopped. In the case of switching such a power saving set state back to a normal set state where power saving is not performed, the throughput of the device is returned to an original throughput, the stoppage of the use of the device is canceled, or the stoppage of the supply of power to the device is canceled.

A power saving method for each device may include the following methods.

(a) Method of changing a CPU performance
(b) Method of changing an image displaying performance
(c) Method of changing the brightness of a display screen
(d) Method of changing a radiation control method
(e) Method of electrically cutting off a semiconductor memory detachable to the system body or an auxiliary storage apparatus (e.g., hard disk drive) being not in use
(f) Method of stopping the supply of power to a link, connection port, or wireless LAN board that can receive power As to CPU control by the method (a), the power consumption can be reduced by minimizing the clock frequency and supply voltage for the CPU. For example, by automatically setting an optimum clock frequency and supply voltage according to a use condition of the apparatus or by limiting the processing speed of the CPU for the purpose of power saving, the battery operation time can be extended.

As to the methods (b) and (c), the brightness of display illumination may be reduced. Alternatively, in the case that no operation is performed over a preliminarily specified period of time or more, a power supply for an illumination light source may be turned off or a display processing speed may be reduced.

As to the method (d), a cooling fan is operated to radiate heat when the temperature of the system body rises. At this time, the important point to be given in performing this radiation control may be specified (e.g., in performing fan control for the CPU, the rotating speed of the fan may be controlled to suppress fan noise and reduce power consumption).

As to the method (e), in the case that a memory medium is not inserted into slot therefor, the supply of power to the slot may be cut off to thereby reduce the power consumption. In the case of a hard disk drive apparatus, the supply of power to the hard disk drive may be cut off when no access to the hard disk is performed over a predetermined or specified period of time or more. Further, in the case that an optical disk drive apparatus built in the system body is not be used for some time or in the case that a disk is not inserted in the drive apparatus, the supply of power to the apparatus may be cut off to reduce the power consumption.

As to the method (f), the power supply to the port or board may be turned off.

As an example of the profile for use in power supply management and power saving setting, "Normal Setting" and "Power Saving Setting" are shown in Table below.

TABLE 1

| | Setting Items | AC/DC | Normal Setting | Power Saving Setting |
|---|---|---|---|---|
| Power Supply Setting | Display Apparatus Power-off (Timer) | AC Connection | No | 5 sec. |
| | | Battery Use | No | 5 sec. |
| | Hard Disk Power-off (Timer) | AC Connection | No | No |
| | | Battery Use | No | 3 min. |
| | System Standby (Timer) | AC Connection | 25 min. later | No |
| | | Battery Use | 25 min. later | 5 min. |
| | System Sleep Mode (Timer) | AC Connection | No | No |
| | | Battery Use | 1 hour later | 1 hour later |
| Device Setting | Brightness of Display Apparatus | AC Connection | Not Change | Not Change |
| | | Battery Use | Not Change | Not Change |
| | CPU Control | AC Connection | Auto-Control | Power Saving Priority |
| | | Battery Use | Power Saving Priority | Power Saving Priority |
| | Radiation Control | AC Connection | Radiation Priority | Silence Priority |
| | | Battery Use | Radiation Priority | Silence Priority |
| | IEEE 1394 Port | AC Connection | Not Change | Not Change |
| | | Battery Use | Not Change | Not Change |
| | Memory Medium Connection Port | AC Connection | Not Change | Not Change |
| | | Battery Use | Not Change | Not Change |
| | Touch Panel Power Saving (Timer) | AC Connection | 3 min. | 5 sec. |
| | | Battery Use | 3 min. | 5 sec. |
| | Wireless LAN | AC Connection | Not Change | Not Change |
| | | Battery Use | Not Change | Not Change |
| | CF Card | AC Connection | Not Change | Not Change |
| | | Battery Use | Not Change | Not Change |
| | Ethernet | AC Connection | Not Change | Auto |
| | | Battery Use | Not Change | Auto |
| | USB in Port Replicator | AC Connection | Auto | Auto |
| | | Battery Use | Auto | Auto |

In Table shown above, the items relating to the power supply setting and the items relating to the power saving setting for various devices etc. are separately shown.

The term of "(Timer)" shown in the column of "Setting Items" means that time setting by timer control is allowed. The time indicated by numerals means the time until the supply of power to the corresponding device is cut off.

The term of "Not Change" means that the current set state is not changed, and the term of "Auto" means that the power supply control is performed according to a connected condition of the connecting apparatus (port replicator) 200 to the system body 100 and the supply of power to the corresponding device is cut off when the connecting apparatus 200 is not connected to the system body 100 (Accordingly, undue power consumption can be avoided).

In relation to the configuration shown in FIG. 5, "IEEE 1394 Port" and "Memory Medium Connection Port" respectively correspond to the ports in the devices 107 and 108, and "Touch Panel" corresponds to the input device 111. Further, "Wireless LAN", "CF Card", and "Ethernet" (registered trademark) respectively correspond to the devices 106, 109, and 110.

The term of "AC Connection" shown in the column of "AC/DC" means that the system is connected to an AC power source, and the term of "Battery Use" means that the system is powered by a battery. For example, in the "DC-remote control profile" shown in FIG. 7, the rows of "Battery Use" in the column of "Power Saving Setting" in Table are to be referred (In the "AC profile" and the "AC-remote control profile", the rows of "AC Connection" in the column of "Normal Setting" are to be referred, and in the "DC profile", the rows of "Battery Use" in the column of "Normal Setting" or "Power Saving Setting" are to be referred).

In Table shown above, the CPU control (e.g., clock frequency control) in the AC power connected condition in the "Normal Setting" is "Auto-Control". As a modification, this setting may be changed to other setting ("Operation Priority" or "Processing Speed Priority") such that a maximum performance for insuring a high-speed operation is exhibited. The term of "Power Saving Priority" in Table means setting for lowering the processing speed of the CPU to reduce the power consumption. Further, the CPU control in the AC power connected condition in the "Power Saving Setting" may be changed to "Auto-Control" (or "Operation Priority").

In Table shown above, the radiation control is set to "Radiation Priority" (larger radiation effect) in the "Normal Setting" and to "Silence Priority" (smaller radiation effect in comparison with "Radiation Priority") in the "Power Saving Setting". As a modification, this setting may be changed to other setting such that "Radiation Priority" is adopted in using the AC power supply and "Silence Priority" is adopted in using the battery.

As to the supply of power to various ports and accessories (e.g., camera and modem), a power-on state may be set in using the AC power supply and a power-off state may be set in using the battery.

In the case that the RC 16 is operated in using the battery to effect the transition from the normal set state to the power saving set state, the operation by the operating portion 119 (see FIG. 5) of the system body 100 is invalidated. The flow of processing for this setting will now be described with reference to FIG. 8.

Figure 8:
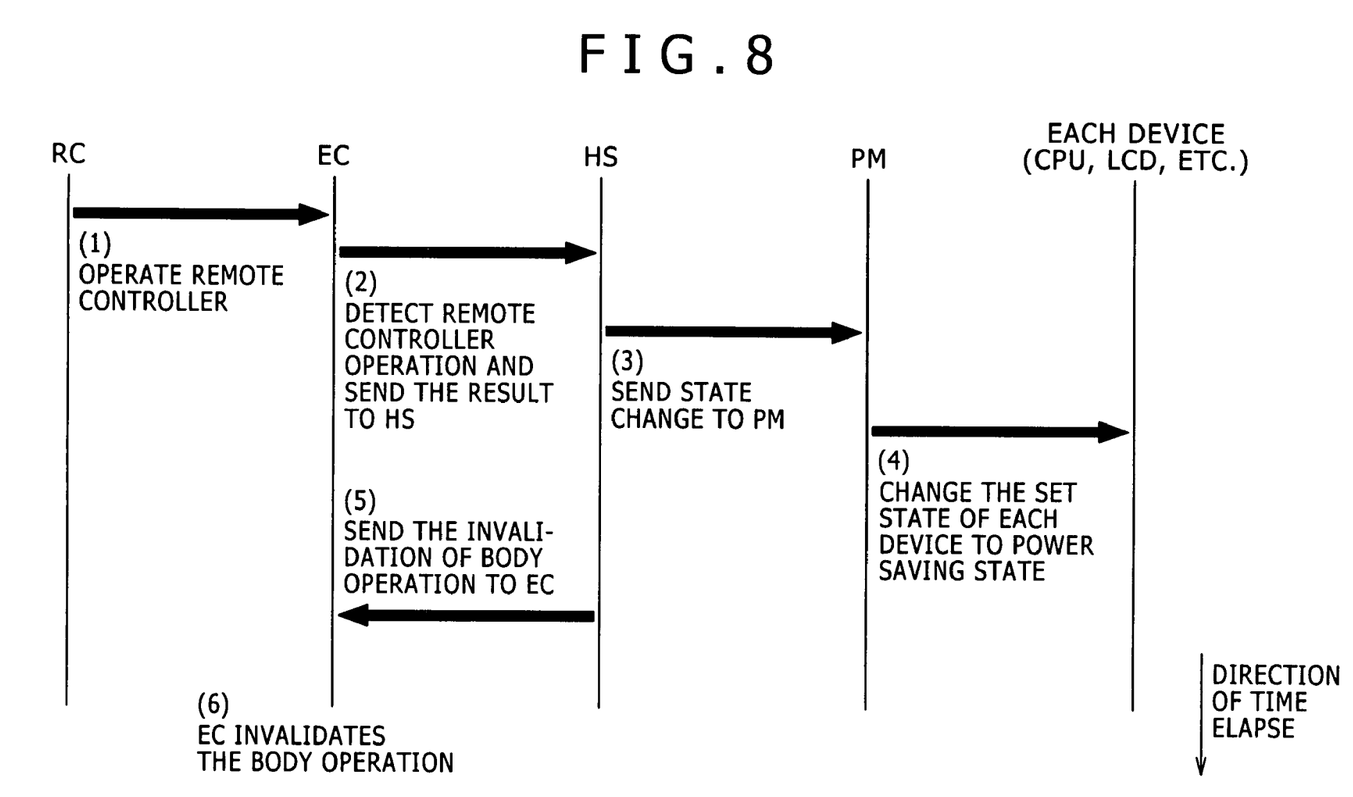
FIG. 8 is a schematic diagram for illustrating the transition from a normal set state to a power saving set state by the remote operation and for also illustrating the invalidation of the operation of an operation element on the system body.

FIG. 8 illustrates the procedure of processing to be carried out among the RC, EC, HS, PM, and each device (CPU, display device, etc.). This procedure is as follows:

(1) Operate the remote controller (RC→EC)

(2) Detect the remote controller operation and send the result to the HS (EC→HS)

(3) Send the state change to the program PM (HS→PM)

(4) Change the set state of each device to a power saving state (PM→each device)

(5) Send the invalidation of any body operation to the EC (HS→EC)

(6) The EC invalidates the body operation

In the above procedure, the shift of (X→Y) represents that information is sent from a transmitting element X to a receiving element Y. Further, sending of the "state change" shown in the above step (3) indicates that a reduction in power consumption of the system body has become necessary because of the remote operation. Accordingly, power saving control is performed in accordance with the set information of the specific profile mentioned above.

According to the above configuration, the following advantages can be obtained.

The body operation and the remote operation are distinguished to automatically switch a power control state. Accordingly, it is possible to realize an improvement in operability, a decrease in operation time, a reduction in footprint of the operating portion, and a reduction in number of switches, for example.

The operation of the remote operation section 4 is detected to automatically change the set state to a power saving state. Accordingly, the user need not especially bear power saving in mind, but power saving can be attained.

In the case of operating the system by the operation of only the remote operation section 4, only necessary minimum equipment is powered to thereby extend a battery operation time, for example (e.g., in the case of operating an information processing terminal as the system accommodated in a bag or the like by the remote operation, not only a battery operation time can be extended, but heat generation from the system can be suppressed due to the power saving effect, thereby improving the safety).

In addition to the power saving function by the standby state (where most parts in the system are powered off to suspend the function as the information processing terminal), the power saving setting allowing the use of the information processing terminal can be realized by specifying the use of the system to supply power to only necessary minimum devices (e.g., the supply of power to the image display apparatus and the external connection terminal portion is cut off, and only the CPU, its related apparatus, and the audio apparatus are powered on to thereby allow a specific use for music reproduction).

The operation of the operation buttons or the like on the system body can be invalidated simultaneously with the change from the normal set state to the power saving set state by the remote operation (not only the power saving of the system body can be realized, but the occurrence of an operational error can be prevented by the invalidation of the operation of the system body. Furthermore, the operation of any operational error prevention switch is not required).

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An information processing apparatus having a system body, a body operation unit provided on said system body, and a remote operation unit configured to perform a remote operation of said system body, said information processing apparatus being configured to perform processing according to operational information obtained by said body operation unit or said remote operation unit, said information processing apparatus comprising:

a detecting unit configured to detect the operation performed by said body operation unit and the remote operation performed by said remote operation unit; and a power control unit configured to control each device in said system body according to at least one of a first state and a second state, said first state defining a state in which power saving control is either not performed or is performed according to a predetermined condition, said second state defining a state in which power consumption is lower than in said first state, invalidate a part of the operation of said body operation unit when said detecting unit detects the remote operation performed by said remote operation unit, and validate a part of the operation of said body operation unit when said detecting unit detects the operation of said body operation unit, wherein said first state is changed to said second state only if the remote operation unit is operated in a battery powered state, and said second state is changed to said first state only if the body operation unit is being operated.

2. The information processing apparatus according to claim 1, wherein said detecting unit is further configured to detect a connection and a disconnection of an AC adapter, and said power control unit is further configured to control each device in said system body according to said first state when said AC adapter is connected and to control each device in said system body according to a said second state when said AC adapter is disconnected.

3. The information processing apparatus according to claim 1, wherein a third state is interposed between the first state and the second state, the first state being changed through the third state to the second state, and the second state being changed through the third state to the first state.

4. The information processing apparatus according to claim 1, wherein power saving control includes at least one of changing a CPU performance, changing an image displaying performance, changing a brightness of a display screen, changing a radiation control method, electrically cutting off a semiconductor memory detachable to the system body or an auxiliary storage apparatus that is not in use, and stopping a supply of power to a link, connection port, or wireless LAN board that can receive power.

5. The information processing apparatus according to claim 4, wherein changing a CPU performance includes minimizing a clock frequency and supply voltage for the CPU.

6. The information processing apparatus according to claim 4, wherein changing a radiation control method includes operating a cooling fan to radiate heat when a temperature of the system body rises by controlling a rotating speed of the cooling fan to suppress fan noise and reduce power consumption.

7. A control method for an information processing apparatus configured to perform processing according to operational information obtained by a body operation unit provided on a system body, or obtained by a remote operation unit configured to perform a remote operation of said system body, said control method comprising:
   detecting an operation by at least one of said body operation unit and said remote operation unit;
   performing power control of each device in said system body according to at least one of a first state and a second state, said first state defining a state in which power saving control is either not performed or is performed according to a predetermined condition, said second state defining a state in which power consumption is lower than in said first state;
   validating a part of the operation performed by said body operation unit when said detecting detects the operation of said body operation unit; and
   invalidating a part of the operation of said body operation unit when said detecting detects the remote operation performed by said remote operation unit, wherein
   said first state is changed to said second state only if the remote operation unit is operated in a battery powered state, and said second state is changed to said first state only if the body operation unit is being operated.

8. The control method according to claim 7, wherein said detecting includes detecting a connection and a disconnection of an AC adapter, and said performing power control includes controlling each device in said system body according to said first state when said AC adapter is connected and controlling each device in said system body according to a said second state when said AC adapter is disconnected.

* * * * *